April 29, 1930.    K. T. HENDERSON    1,756,355

METHOD OF AND MEANS FOR PREPARING CORD FABRIC FOR TIRE BUILDING

Filed Sept. 14, 1928

Inventor:
Kirby T. Henderson,
by Spear, Middleton, Donaldson & Hall
Attys.

Patented Apr. 29, 1930

1,756,355

UNITED STATES PATENT OFFICE

KIRBY T. HENDERSON, OF AKRON, OHIO, ASSIGNOR TO THE MILLER RUBBER COMPANY, OF AKRON, OHIO, A CORPORATION OF OHIO

METHOD OF AND MEANS FOR PREPARING CORD FABRIC FOR TIRE BUILDING

Application filed September 14, 1928. Serial No. 306,035.

My invention relates to improvements in method and means for preparing cord fabric for tire building.

An object of the invention is to provide a method and means for splicing together plies of bias cut tire fabric.

A further object is to provide a method of splicing the plies end to end for delivery to the tire builder, whereby too firm an adhesion is avoided so that the tire builder may easily separate the plies when they are delivered to him.

Other objects will appear hereinafter.

It is common practice in the building of cord tires to bias cut the fabric to the proper width and then to superimpose two of these plies with their cords crossing and each being of the proper length to make the full circumference of the tire. These plies, when so assembled, are delivered to the tire builders, who stretch the plies on to a core and splice the end of the double ply together, so as to make a butt joint in each ply. This splice is known as a fish-tail splice and is illustrated in Fig. 2 of the accompanying drawings, in which the splice is shown partly completed in order to show the direction in which the cords run, and for other reasons which will hereafter be explained.

The reason for putting on two plies of cord fabric at once is that the cords running in opposite directions will reinforce the plies so that they may be stitched down with the ordinary stitching machine. As it is desirable to have these plies come to the tire builders in the exact length necessary, this is done on a preparation table, where the plies are measured in lengths, and it being easy to separate the fabric at any point between two cords, the operator tears off any amount in excess of the length desired for the particular ply and uses the pieces torn off to make up the length of any ply which might be too short, uniting them by butting the two pieces together with the cords running parallel.

After the finished plies are made up and ready to deliver to the tire builder, as double plies, it has been customary to place these plies in books, or they may pass to the tire builder on a conveyor. Attempts have been made to splice these double plies together end to end and deliver them to the tire builder in one continuous length. However, these plies sometimes reach the tire builder with the ends so firmly stuck together that it is difficult for him to separate one double ply from the next one. This is especially true where the continuous length of material passes over rollers or between rollers on its way to the tire builders.

The present invention contemplates a method of splicing the plies together and avoiding too firm an adhesion, so that the builder may easily separate the plies when they come to him.

Figure 1:
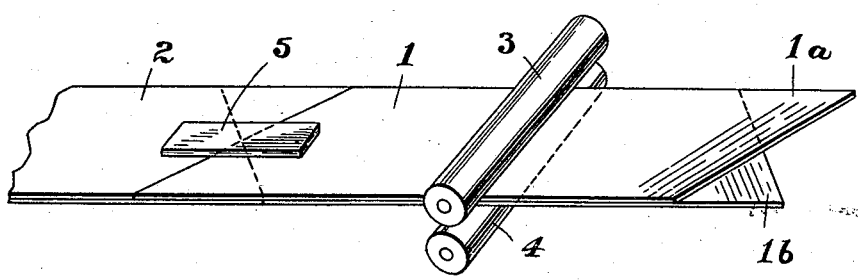
Figure 1 is a perspective view showing a doubled ply spliced to a second double ply and passing through a pair of rollers.

Referring to the drawings, 1 represents the doubled ply composed of single plies 1ª and 1ᵇ. These single plies are bias cut to the proper width and superimposed with their cords crossing, and each being of proper length to extend throughout the full circumference of the tire.

Spliced to the double ply 1 is a second doubled ply 2.

It being desirable to expel all of the air between the pieces 1ª and 1ᵇ, it is customary to provide a pair of spring-pressed rollers 3 and 4, similar to an ordinary wringer, between which the material is passed to expel the air.

If the doubled ply 1 is spliced to the doubled ply 2 and these are passed between the rolls 3 and 4, which are spring-pressed toward each other, the splice will be so firmly united as to render it impossible of separation by the builder.

The present invention avoids this by providing a strip of fabric 5 equal in length to the length of the splice, and in width, much narrower than the ply. The strip 5 is preferably composed of several superimposed layers of unvulcanized tire fabric. The strip 5 is placed on the splice, as shown in Fig. 1, after the splice has been lightly pressed together by hand, and then as the plies pass through the rolls 3 and 4, when the splice is reached, the strip 5 providing an added thickness prevents rolls 3 and 4 from exerting any effective splicing pressure on the fish-tail points of the splice.

Figure 2:
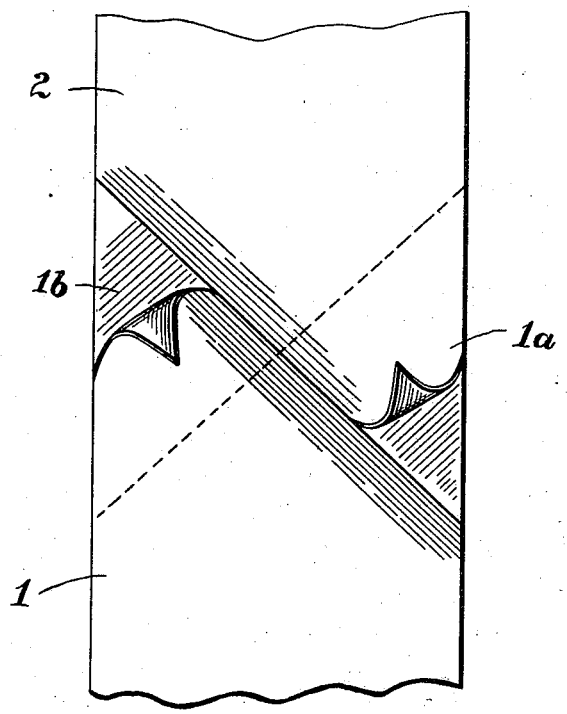
Fig. 2 shows the double fish-tail splice partially formed with the corners rolled back.

Upon this splice reaching the tire builder, he removes the strip 5 for re-use and then opens up the splice by picking up the corners of the fish-tail, as indicated in Fig. 2.

The strip or piece of tire fabric 5 being made of unvulcanized material, is adhesive, and therefore will stay in place even though the fabric may be led in a vertical direction, and as it contacts with both plies 1 and 2, it acts as a bond between them until it is removed.

I do not wish to limit myself to the exact shape and structure of the elevating or spacing strip 5, as it is apparent that many modifications may be made without departing from the spirit and scope of my invention.

I claim:

1. The hereindescribed method of splicing plies of tire fabric comprising spacing a portion of the splice away from the surface of one of a pair of rolls between which the juxtaposed plies are passed.

2. The hereindescribed method of splicing bias cut doubled plies of tire fabric end to end for conveying them in spliced condition to the tire builder comprising spacing a portion of the splice away from the surface of one of a pair of rolls between which the juxtaposed plies are passed.

3. The hereindescribed method of splicing plies of tire fabric comprising spacing the side portions of the splice away from the surface of one of a pair of rolls between which the juxtaposed plies are passed.

4. The hereindescribed method of splicing plies of tire fabric comprising applying a superposed strip of unvulcanized tire fabric centrally of the splice, and passing the splice and superposed strip between rolls.

5. The hereindescribed method of fish-tail splicing bias cut doubled plies of tire fabric end to end for conveying them in spliced condition to the tire builder comprising applying a superposed narrow strip of unvulcanized tire fabric centrally of the splice and ply, and passing the splice with the superposed strip between rolls.

6. The hereindescribed method of fish-tail splicing bias cut doubled plies of tire fabric end to end for conveying them in spliced condition to the tire builder comprising spacing the side portions of the splice out of contact with the surface of one of a pair of rolls between which the juxtaposed plies are passed, whereby the points of the fish-tail are substantially free.

7. In combination in a double ply fish-tail splice of tire fabric, a superposed spacer strip disposed centrally of the splice and adapted to space the side portions of the splice from contact with one of a pair of rolls between which the splice is adapted to be passed.

8. In combination in a double ply fish-tail splice of tire fabric, a superposed spacer strip disposed centrally of the splice, said strip being narrower than the ply and as long as the splice, said strip being adapted to space the side portions of the splice from contact with one of a pair of rolls between which the splice is adapted to be passed.

9. In combination in a splice of plies of tire fabric, a superposed spacer strip disposed centrally of the splice and adapted to space the side portions of the splice from contact with one of a pair of rolls between which the splice is adapted to be passed.

10. In combination in a splice of plies of tire fabric, a superposed spacer strip disposed centrally of the splice and adapted to space the side portions of the splice from contact with a roll.

In testimony whereof I affix my signature.

KIRBY T. HENDERSON.